US010989283B2

(12) United States Patent
McAuley

(10) Patent No.: US 10,989,283 B2
(45) Date of Patent: Apr. 27, 2021

(54) ANTI-BACKLASH NUT

(71) Applicant: N2 Imaging Systems, LLC, Irvine, CA (US)

(72) Inventor: Daniel E. McAuley, Irvine, CA (US)

(73) Assignee: N2 Imaging Systems, LLC, Irvine, CA (US)

(*) Notice: Subject to any disclaimer, the term of this patent is extended or adjusted under 35 U.S.C. 154(b) by 84 days.

(21) Appl. No.: 16/271,071

(22) Filed: Feb. 8, 2019

(65) Prior Publication Data

US 2020/0256438 A1   Aug. 13, 2020

(51) Int. Cl.
| | | |
|---|---|---|
| *F16H 25/24* | (2006.01) | |
| *F16H 25/20* | (2006.01) | |
| *G03B 9/08* | (2021.01) | |

(52) U.S. Cl.
CPC ..... *F16H 25/2006* (2013.01); *F16H 25/2009* (2013.01); *G03B 9/08* (2013.01)

(58) Field of Classification Search
CPC ........... Y10T 74/18728; F16H 25/2003; F16H 25/2006; F16H 25/2009; F16H 2025/2012; G03B 9/08
See application file for complete search history.

(56) References Cited

U.S. PATENT DOCUMENTS

| | | | | |
|---|---|---|---|---|
| 2,643,845 A | * | 6/1953 | Baker | G01C 5/00 248/180.1 |
| 4,198,872 A | * | 4/1980 | Metz | F16H 25/2204 74/424.75 |
| 4,896,552 A | * | 1/1990 | Virga | F16H 25/2209 74/441 |
| 5,263,381 A | * | 11/1993 | Shirai | F16H 25/2209 74/441 |
| 5,303,606 A | | 4/1994 | Kokinda | |
| 5,492,030 A | * | 2/1996 | Benton | F16H 25/2209 74/424.82 |
| 5,644,951 A | * | 7/1997 | Hatamura | B23Q 1/34 74/424.72 |
| 5,749,265 A | * | 5/1998 | Namimatsu | F16H 25/2204 74/424.75 |
| 6,311,576 B1 | | 11/2001 | Pletschet | |
| 8,051,729 B2 | * | 11/2011 | Yoshida | F16H 25/2209 74/424.81 |
| 2009/0308192 A1 | * | 12/2009 | Lin | F16H 25/2204 74/424.81 |
| 2014/0260748 A1 | | 9/2014 | Traver | |

* cited by examiner

*Primary Examiner* — Randell J Krug
(74) *Attorney, Agent, or Firm* — Knobbe, Martens, Olson & Bear, LLP

(57) ABSTRACT

An anti-backlash nut for engaging a threaded screw includes an anti-backlash nut body extended along a longitudinal axis configured and adapted to receive a screw, the anti-backlash nut body including a first threaded section having a first inner diameter with a first internal thread and a second threaded section integral to the first threaded section having a second internal thread, where the first thread and the second thread have an equal pitch and are out-of-phase with respect with each other.

14 Claims, 3 Drawing Sheets

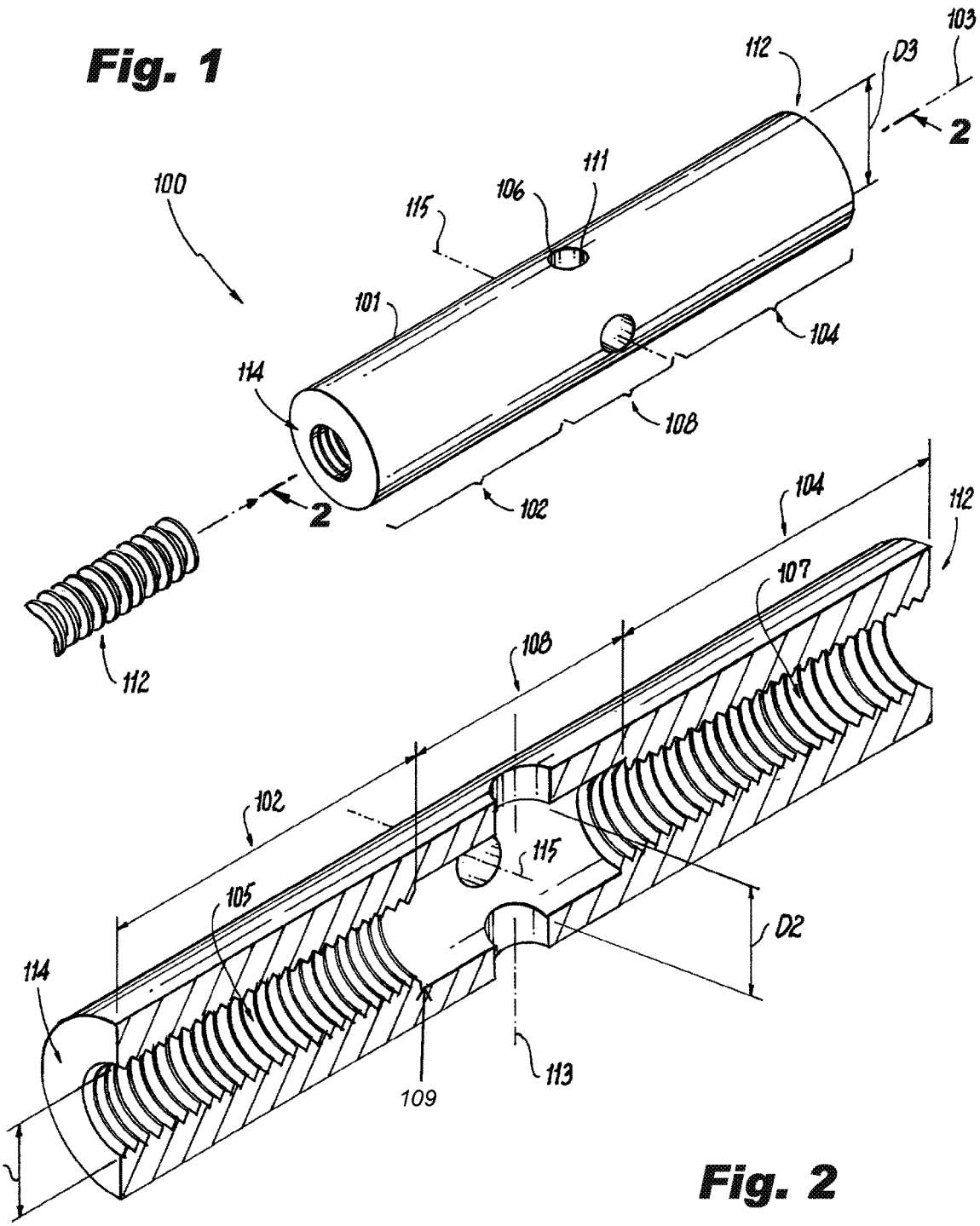

ANTI-BACKLASH NUT

BACKGROUND

1. Field

The present disclosure relates to an anti-backlash nut, and more particularly to an anti-backlash nut for use in a shutter mechanism.

2. Description of Related Art

Imaging systems such as cameras utilize shutters to cover over the imaging sensor. In infrared imaging systems, calibration shutters are used to recalibrate the imaging sensor. In this context, a shutter covers the sensor and the sensor images the shutter. The shutter can be temperature controlled, or a sensor can be used to determine the temperature of the shutter. Using the known temperature of the calibration shutter allows the system to recalibrate the imaging sensor. If this is done periodically, the imaging sensor can stay well calibrated. One drawback to shutter actuation is that the shutter can generate audible noise as it is actuated. In sound sensitive applications, the actuation noise of a calibration shutter can be a disadvantage. Backlash in the system can result in unnecessary sound and delay. Even more, the additional motion of the shutter from backlash can allow misalignment over the sensor, preventing complete sensor coverage. Typical anti-backlash, as might be used in positioning/linear stages or other, generally require a number of parts along with consequent added, cost, weight, size.

The conventional techniques have been considered satisfactory for their intended purpose. However, there is an ever present need for improvement. This disclosure provides a solution for this need.

SUMMARY

An anti-backlash nut includes an anti-backlash nut body extending along a longitudinal axis for receiving a threaded screw. The anti-backlash nut body includes a first threaded section with a first inner diameter with a first internal thread and a second threaded section integral to the first threaded section with a second internal thread. The first thread and the second thread have an equal pitch and are out-of-phase with respect with each other. A third section can be positioned axially between the first threaded section and the second threaded section. The third section can be non-threaded. The third section can be integral to the first threaded section and the second threaded section. The third section can have an inner diameter that is larger than the first inner diameter, and a stepped down transition from the first inner diameter to the second inner diameter.

The third section can include a deformation feature. The deformation feature can include at least one aperture transverse to the longitudinal axis. The deformation feature can also include a through-hole transverse to the longitudinal axis. The deformation feature can also include a pair of through holes transverse to the longitudinal axis and perpendicular to each other.

The anti-backlash nut body can include a single outer diameter for the first threaded section, the second threaded section, and the third section. The anti-backlash nut body can include an axially uninterrupted outer diameter. The anti-backlash nut body can be made of a deformable material.

The anti-backlash nut body can move along a screw threaded therein. The screw can be connected to a motor, and be disposed within a camera shutter system, for rotationally driving the screw.

A method of forming a longitudinally extended anti-backlash nut includes threading a first section of an anti-backlash nut body with a thread having a first pitch and threading a second section of the anti-backlash nut body with a thread having an equal pitch to the first pitch and being out-of-phase with the thread of the first section. The first section can be threaded from a first end and the second section can threaded from a second end. A portion of the anti-backlash nut body can be removed in order to create at least one through-hole between the first section and the second section perpendicular to the longitudinal axis.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein:

FIG. 1 is a perspective view of an anti-backlash nut showing an anti-backlash nut body;

FIG. 2 is a cross-sectional perspective view of the anti-backlash nut of FIG. 1, showing the inside of the anti-backlash nut body;

DETAILED DESCRIPTION

Figure 3A:
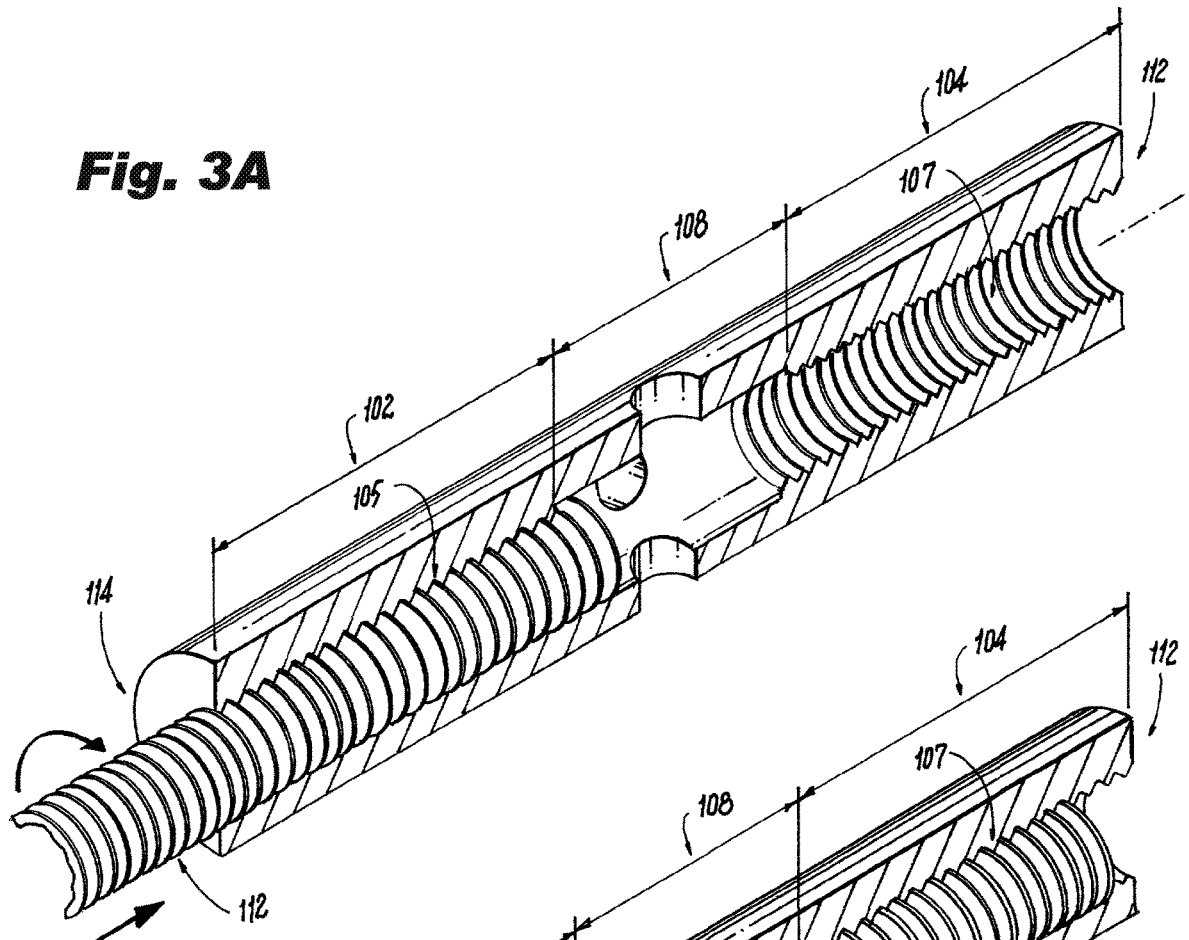
FIG. 3A is a cross-sectional perspective view of the anti-backlash nut of FIG. 1, showing the screw engaged with the first portion.

Reference will now be made to the drawings wherein like reference numerals identify similar structural features or aspects of the subject invention. For purposes of explanation and illustration, and not limitation, a perspective view of an exemplary embodiment of an anti-backlash nut in accordance with the disclosure is shown in FIG. 1 and is designated generally by reference character 100. The methods and systems of the invention can be used to simplify an anti-backlash system and increase reliability in shutter systems. The anti-backlash nut is compressed or is in tension axially when a screw is threaded therein, for removing backlash out of the system. When the anti-backlash nut is under stress, it reacts to screw movements more effectively, in moving a shutter.

Referring now to FIG. 1, an anti-backlash nut 100 including an anti-backlash nut body 101 extending along a longitudinal axis 103 for receiving a threaded screw 112. The anti-backlash nut body 101 includes a first threaded section 102, a second threaded section 104 integral to the first threaded section 102, and a third section 108. The third section 108 is integral to the first threaded section 102 and the second threaded section 104 and positioned axially between the first threaded section 102 and the second threaded section 104, and includes a deformation feature 106, helping deform, compress, or put the anti-backlash nut body 101 under tension when a threaded screw 112 is threaded therein. The deformation feature 106 can include at least one aperture 111 transverse to the longitudinal axis 103. It is also contemplated, the deformation feature 106 can include a through-hole 113 transverse to the longitudinal axis 103. The deformation feature can also include a pair of through holes 113, 115 transverse to the longitudinal axis and perpendicular to each other.

With continued reference to FIG. 1, the anti-backlash nut body 101 includes a single outer diameter D3 for the first threaded section 102, the second threaded section 104, and the third section 108. The anti-backlash nut body 101 includes an axially uninterrupted outer diameter D3 extending the length of the anti-backlash nut body 101. It is also conceived that the diameter D3 could undulate or change along the length of the anti-backlash nut body 101, specifically in an area of the third section 108. The anti-backlash nut body 101 can be made of an elastically deformable material, in order to help compress, tension, or deform the anti-backlash nut body 101.

As shown in FIG. 2, the first threaded section 102 includes a first inner diameter D1 with a first internal thread 105 and the second threaded section 104 integral to the first threaded section 102 includes a second internal thread 107. The third section 108 is non-threaded. The third section 108 can have an inner diameter D2 that is larger than the first inner diameter D1, and a stepped down transition 109 from the first inner diameter D1 to the second inner D2 diameter. It is also contemplated that the deformation feature 106 can include a larger inner diameter D2, resulting in thinner and more deformable outer walls.

Figure 3B:
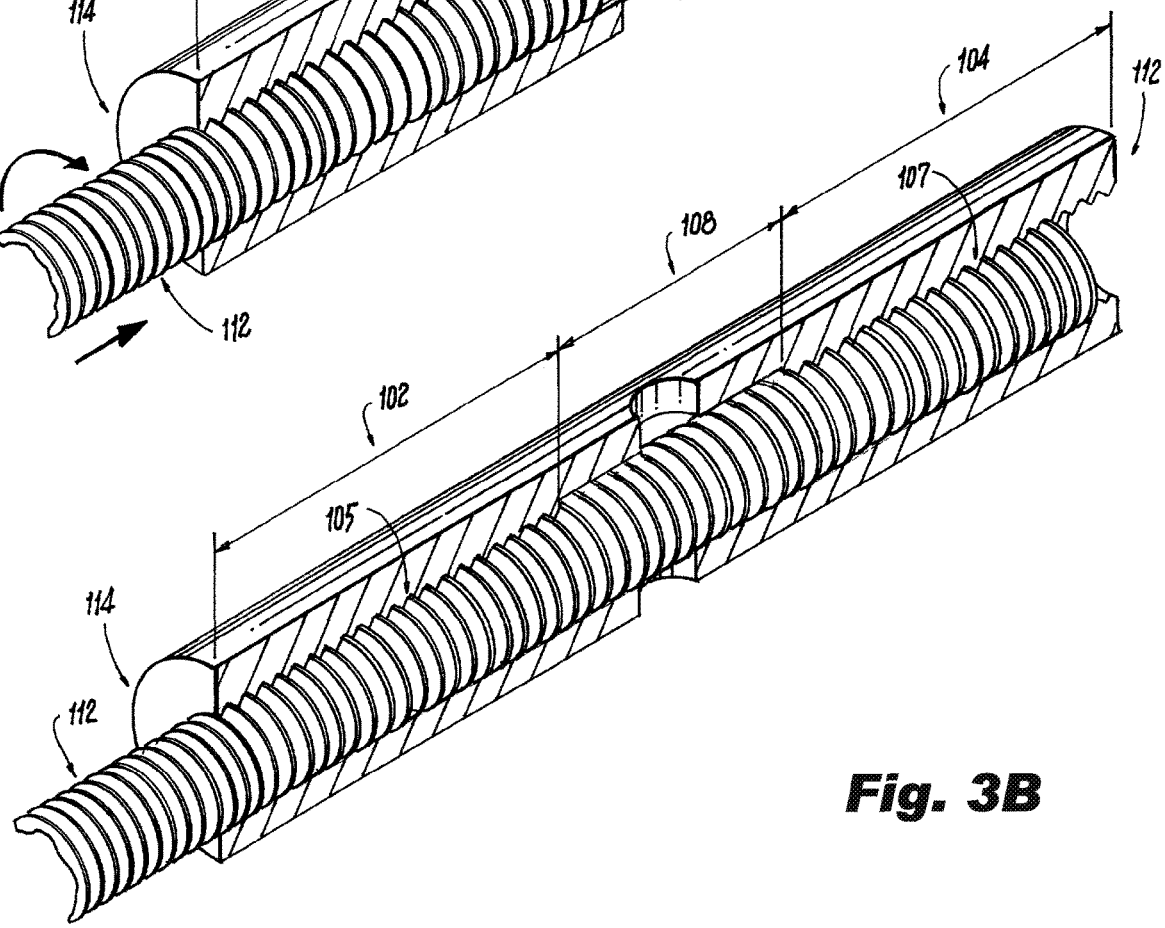
FIG. 3B is a cross-sectional perspective view of the anti-backlash nut of FIG. 1 showing the screw engaged with the second portion.

As shown in FIG. 3a, the first thread 105 and the second thread 107 have an equal pitch and are out-of-phase with respect with each other. The screw 112 is threaded into the anti-backlash nut body 101 and engages the first thread 105 of the first threaded section 102, passes by the non-threaded section 108, and engages the second thread 107 of the second threaded section 104. Since the second thread 107 of the second threaded section 104 are out-of-phase with the thread 105 of the first threaded section 102, the screw 112 deforms (shown in FIG. 3b) the anti-backlash nut body 101 in order for the screw 112 to engage the threads 107 of the second threaded section 104.

Figure 4:
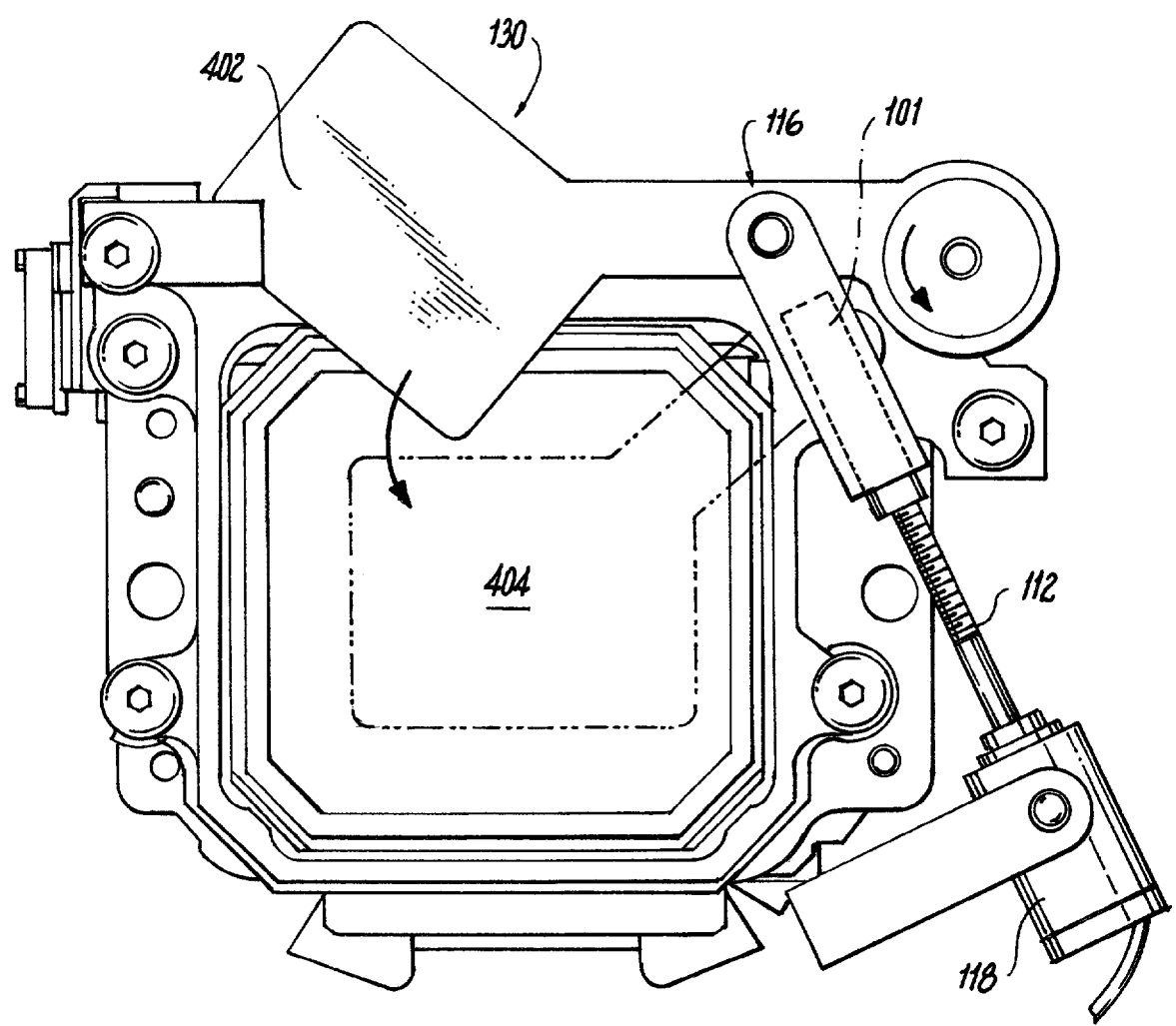
FIG. 4 is a plan view of the anti-backlash nut of FIG. 1, showing the anti-backlash nut body connected to a motor of a camera shutter system.

As shown in FIG. 4, the anti-backlash nut body 101 can move axially along the screw 112 as the screw 112 threaded therein. The screw 112 can be connected to a motor 118, and be disposed within a camera shutter system 116, for rotationally driving the screw 112. As the screw rotates relative to the anti-backlash nut body 101, the anti-backlash nut body 101 moves along the screw 112 and actuates a flag 130 of the shutter system 116 between an a first position 402 and a second position 404.

A method of forming a longitudinally extended anti-backlash nut 100 includes threading a first section 102 of an anti-backlash nut body 101 with a thread 105 having a first pitch and threading a second section 104 of the anti-backlash nut body 101 with a thread 107 having an equal pitch to the first pitch and being out-of-phase with the thread of the first section. The first section 102 is threaded from a first end 114 and the second section 104 is threaded from a second end 115. A portion of the anti-backlash nut body is removed in order to create at least one through-hole 113 at a location between the first section 102 and the second section 104 perpendicular to the longitudinal axis 103.

It is also conceived that the anti-backlash nut body 101 can be threaded through the entire length from one end, with a back-boring operation clearing out the center section 108 of threads. The center section 108 is then deformed by compression or tension by an amount equal to a multiple of a thread pitch, thus ensuring that the first 102 and second section 104 are out of phase. Finally, the screw 112 is threaded into the anti-backlash nut body 101 and the external force is removed. It is also conceived that the anti-backlash nut body 101 is threaded from each end separately, threads being ½ a thread length out of phase from one end vs the other. The two threads overlap in the center section 108 to sufficiently clear that area of threading. The center section 108 of the anti-backlash nut body 101 is deformed by compression or tension by an amount equal to 1½ or 2½ multiples of the thread length and screw 112 is threaded into the anti-backlash nut body 101 and the external force is removed. It is also conceived that a hybrid of the methods presented above can be used which allows threading from the two ends separately, but without being held to being one half a thread length out of phase.

What is claimed is:

1. An anti-backlash nut for engaging a threaded screw comprising:
    an anti-backlash nut body extended along a longitudinal axis configured and adapted to receive a screw, the anti-backlash nut body including:
    a first threaded section having a first inner diameter with a first internal thread;
    a second threaded section integral to the first threaded section having a second internal thread, wherein the first thread and the second thread have an equal pitch and are out-of-phase with respect with each other; and
    a third section positioned axially between the first threaded section and the second threaded section, wherein the third section includes a deformation feature comprising a pair of through holes transverse to the longitudinal axis and perpendicular to each other.

2. The anti-backlash nut of claim 1, wherein the third section is non-threaded.

3. The anti-backlash nut of claim 1, wherein the third section is integral to the first threaded section and the second threaded section.

4. The anti-backlash nut of claim 1, wherein the anti-backlash nut body includes a single outer diameter for the first threaded section, the second threaded section, and the third section.

5. The anti-backlash nut of claim 1, wherein the anti-backlash nut body includes an axially uninterrupted outer diameter.

6. The anti-backlash nut of claim 1, wherein the anti-backlash nut body includes a deformable material.

7. The anti-backlash nut of claim 1, wherein the anti-backlash nut body is disposed within a camera shutter system.

8. The anti-backlash nut of claim 1, wherein the pair of through-holes do not overlap with each other along a line parallel to the longitudinal axis.

9. The anti-backlash nut of claim 1, wherein the pair of through-holes are disposed such that a line parallel to the longitudinal axis does not intersect more than one of the pair of through-holes.

10. The anti-backlash nut of claim 1, wherein a cross section of at least one of the pair of through-holes is a circle.

11. The anti-backlash nut of claim 1, wherein the third section has an inner diameter that is larger than the first inner diameter.

12. The anti-backlash nut of claim 11, wherein the first inner diameter is stepped to the second inner diameter.

13. The anti-backlash nut of claim 1, further comprising the screw wherein the anti-backlash nut body is configured to move along the screw threaded therein.

14. The anti-backlash nut of claim 13, wherein the screw is connected to a motor for rotationally driving the screw.

* * * * *